(No Model.)
W. L. CHURCH.
GAS CONDENSER.
No. 551,721.  Patented Dec. 17, 1895.
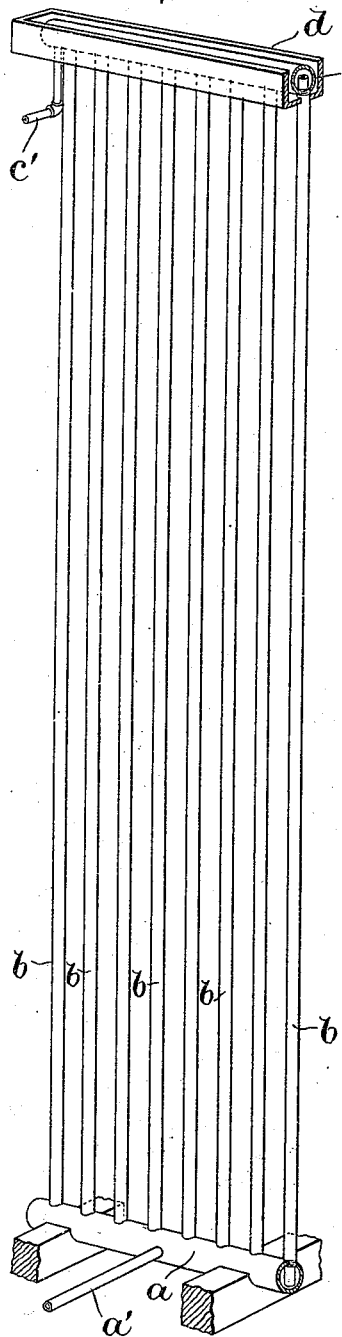
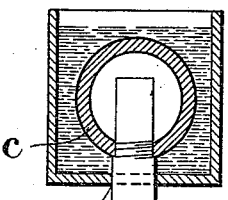
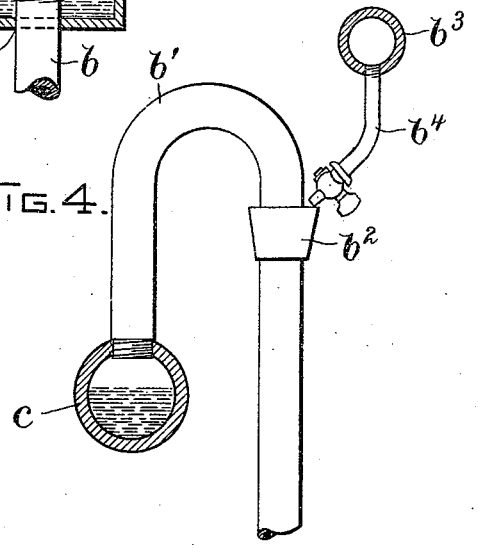
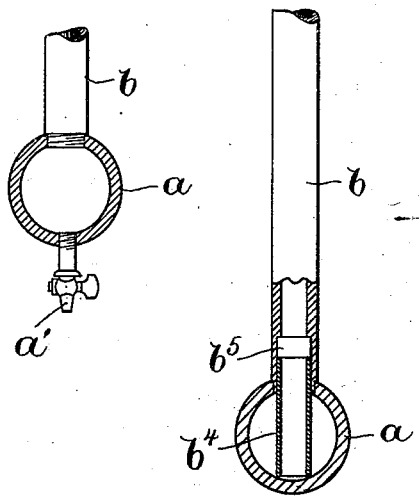
WITNESSES:
A. D. Harrison
Rollin Abell
INVENTOR:
Wm. Lee Church
by Knight Brown & Quinby
Attys.

UNITED STATES PATENT OFFICE.

WILLIAM LEE CHURCH, OF NEWTON, MASSACHUSETTS.

GAS-CONDENSER.

SPECIFICATION forming part of Letters Patent No. 551,721, dated December 17, 1895.

Application filed October 14, 1895. Serial No. 565,541. (No model.)

*To all whom it may concern:*

Be it known that I, WILLIAM LEE CHURCH, of Newton, in the county of Middlesex and State of Massachusetts, have invented certain new and useful Improvements in Gas-Condensers, of which the following is a specification.

This invention relates to apparatus for condensing ammoniacal and other gases which become liquid when their temperature is reduced.

The invention has for its object to provide a simple and effective apparatus of this class, adapted to effect a rapid and continuous condensation and a free and uniform upward discharge of the liquid of condensation, without intermission caused by clogging accumulations of said liquid. The invention also has for its object to insure by an upward flow and discharge an efficient thermal action of the cooling agent and economy in the use thereof.

The invention is based upon the principle of introducing the gas into the lower end of a continuous pipe or conduit of relatively-small diameter, having its discharge end higher than its receiving end, and externally cooling said pipe and thus causing a cumulative condensation to take place therein, the rapidity of condensation increasing toward the upper or discharge end, so that the gas-pressure is correspondingly reduced in the region of said upper end, and the gas is caused to rush from other points to the point of lowest pressure there created, thus inducing a movement of the liquid of condensation upward to and out of the discharge end of the pipe.

An important feature of my invention is the relatively-small diameter of the pipe, whereby such condensation as can be carried on by an economical use of the cooling agent is enabled to induce a sufficiently-rapid flow of gas to continuously eject the liquid from the upper end of the condensing-pipe in the form of drops or small detached masses without liability of the liquid accumulating in sufficient quantities to clog the apparatus and render its operation spasmodic.

The invention therefore consists in the combination of a continuous condensing-pipe of relatively-small internal diameter, having its discharge end higher than its receiving end, means for admitting gas to the lower end of said pipe, and means for cooling the external surface of said pipe, the cooling means being preferably a stream or film of water flowing downwardly on the pipe, so that the rising gas is cumulatively cooled and condensed by the descending water, the ascending partially-liquid contents of the pipe being last acted on by the coldest portion of the water, whereby the utmost thermal efficiency of the water is utilized and a sufficient velocity of upward movement of gas maintained within the pipe to carry with it and eject the liquid.

Of the accompanying drawings, forming a part of this specification, Figure 1 represents a perspective view, partly in section, showing an apparatus embodying my invention. Figs. 2 and 3 represent views of parts of the apparatus. Fig. 4 represents a modification. Fig. 5 represents another modification.

The same letters of reference indicate the same parts in all the figures.

$a$ represents a substantially horizontal header or gas-receptacle, having an inlet-pipe $a'$, through which heated gas under pressure enters the receptacle $a$.

$b\ b\ 5$ represent a series of substantially vertical pipes, which extend upwardly from the receptacle $a$ to any suitable height. I have found seventeen feet (17') to be sufficient for the height of said pipes, although I do not limit myself in this particular.

The pipes $b$ are here shown as extending from points near the bottom of the receptacle $a$, the lower ends of the pipes being in close proximity to the bottom of the receptacle, so that the greater part of said receptacle is above the lower ends of the pipes. This arrangement is preferred, because the narrow spaces between the bottom of the receptacle $a$ and the lower ends of the pipes enable the flow of gas to rapidly seize upon and lift any accumulations of condensed liquid on the bottom of the receptacle and carry the same in form of slugs or small detached masses upwardly through the pipes, the liquid being in this way so rapidly disposed of that it cannot accumulate in quantity sufficient to obstruct the lower or receiving ends of the pipes.

$c$ represents a receptacle for the liquid of condensation, communicating with the upper or discharge ends of the pipes $b$, said receptacle being located below said discharge ends, so that liquid discharged from said pipes will flow downwardly and accumulate outside of and below the discharge ends, leaving the latter unobstructed.

In Figs. 1 and 3 the pipes $b$ are shown as passing through the bottom of the tube or header composing the receptacle $c$, the upper ends of the pipes being near the top of said tube, so that the receptacle is that part of the tube below the upper ends of the pipes.

In Fig. 4 I show the pipe $b$ connected by a return bend $b'$ with the upper part of the receptacle.

The receptacle $c$ has a suitable outlet-pipe $c'$.

In Figs. 1 and 3 I show a tank $d$ inclosing the upper portions of the pipes and the receptacle $c$, said tank having a small discharge-opening $d'$ near each pipe. Each opening $d'$ is arranged to discharge a small stream of water upon the corresponding pipe, the water flowing downwardly and enveloping the pipe in a thin descending film flowing to the bottom of the pipe. The tank is to be kept supplied with water in any suitable way.

In Fig. 4 I show as a means for maintaining a film of water upon one of the pipes $b$ a tapering collar $b^2$ surrounding the pipe near its upper end, there being an orifice or crevice between the lower end of the collar and the pipe to permit a sufficient quantity of water to flow from the interior of the collar downwardly along the pipe. In this case water may be supplied to the collars $b^2$ by means of a supply-pipe $b^3$ and nozzles $b^4$ communicating therewith and arranged to discharge water into the collars $b^2$.

It will be seen that the heated gas entering the receptacle $a$ will pass upwardly through the pipes $b$, the descending films of water upon the outside of said pipes absorbing heat from the gas within the pipes, so that the gas becomes gradually cooled and condensed as it rises, the condensation being more rapid at the upper portions of the pipes than at lower points because the water is coolest, the water being gradually warmed as it progresses downwardly. The rapid condensation taking place in the upper portions of the pipes near their discharge ends causes a cumulative decrease in pressure toward these portions of the pipes, so that the gas-pressure from below, rushing to said points, is enabled to sweep upwardly the liquid formed by condensation, the liquid passing either in independent drops or in small detached masses or slugs upwardly to and through the discharge ends of the pipes into the receptacle $c$, whence it is removed through the outlet $c'$. It will be seen that in this way the condensation is continuously carried on, and the thermal effect of the cooling liquid is fully utilized by the counter-flow of cold water and hot gas, the contents of the pipes being last acted upon by the coldest part of the water, so that the liquid discharged from the pipes is at substantially the same temperature as the water when it first comes in contact with the outside of the pipes.

The continuous propulsion of the liquid of condensation and its discharge from the upper or highest end of the condensing-pipe as fast as it is formed, without giving it an opportunity to run back or collect in clogging masses, being one of the objects of my invention, I desire to call attention to the fact that it is essential that the current of gas in the condenser-pipe move with sufficient velocity to overcome the adhesion of the drops to the pipe, the friction of the liquid on the pipe, and the weight of the liquid.

I have found by numerous experiments that to induce a gas-current of sufficient velocity by cumulative condensation caused by the action of an economical cooling agent, such as water at its natural temperature, the pipe should be of such relatively-small internal diameter that the gas-current will be concentrated, as it were, and its velocity increased, the current thus being made effective for the purpose above mentioned, the velocity depending on the relation between the internal diameter of the pipe and the rapidity of condensation. The velocity required depends somewhat on the nature of the liquid, viscous liquids requiring a greater velocity of the gas-current than more limpid liquids. I find that for liquid ammonia produced by the condensation of ammoniacal gas a suitable internal diameter of each pipe is one inch when the cooling agent is water at its natural temperature and the pipe is about seventeen feet long. I do not, however, limit myself to any particular diameter or length of pipe, as different conditions may require different diameters and lengths.

The fundamental principle on which my invention is based is the establishment of such relation between the internal diameter of an externally-cooled pipe and the rapidity of cumulative condensation produced therein that a gas-current will be induced of sufficient velocity to sweep away the liquid of condensation as fast as it is formed, sweeping it upwardly against the action of gravity and therefore in the opposite direction to the gravity-flow of the exterior cooling-water, and finally discharging it from the highest instead of the lowest end of the condensing-pipe and at the lowest temperature available from the water. Hence the invention my be embodied in other forms of apparatus in which the pipes in which the liquid is condensed and swept upward may be somewhat differently arranged.

It is obvious that a single pipe having a limited internal diameter and connected at the lower end with a source of gas-supply, combined with means for externally cooling said pipe, would be within the scope of my invention. I do not, therefore, limit myself to the employment of a series of pipes and the headers or receptacles connecting the same at their ends, although this is the best construction of which I am aware, it being simple, economical, and effective.

In the construction shown in Figs. 1 and 4 I prefer to provide the lower ends of each pipe $b$ with a sliding nipple $b^4$ fitted to move in an enlargement $b^5$ within the pipe, as shown in Fig. 2, said nipple constituting the lower end of the pipe and being self-adjusting, so that when the pipe $b$ is screwed into the header $a$ the lower end of the nipple $b^4$ will come to a bearing on the lower part of the pipe, so that no special care will be required in screwing in the pipe $b$, it being desirable to have the nipple $b^4$ bear directly on the lower portion of the pipe, so that only a narrow crevice due to the curvature of the pipe will exist below the nipple.

I do not limit myself to the downward extension of the pipe $b$ into the header $a$, as the leading principle of my invention—namely, the creating of an upward flow of the gases and condensed liquid in a contrary direction to the downward flow of the external condensing-water—is operative in a construction such as that shown in Fig. 5. Such a construction, however, must accumulate a body of condensed liquid in the lower header $a$ during a temporary cessation of operation, requiring the same to be removed by a drain $a'$ before starting, and I therefore prefer the construction shown in Fig. 2.

I claim—

1. In a gas condenser, the combination of a continuous pipe of relatively small internal diameter having its discharge end higher than its receiving end, means for admitting gas to the lower or receiving end thereof, and means for externally cooling said pipe and thereby causing cumulative condensation within the pipe, whereby a flow or pressure of gas is constantly maintained toward the higher or discharge end with sufficient velocity to sweep along and continuously eject the liquid of condensation therefrom either in independent drops or in masses, the relation of the diameter of the pipe to the rapidity of condensation being such that an efficient velocity is given to the current of gas, as set forth.

2. In a gas condenser, the combination of a substantially vertical continuous pipe of relatively small internal diameter, means for admitting gas to the lower end of said pipe, and means for maintaining a downward current or film of water on the external surface of said pipe, the arrangement being such that the gas and water flow in opposite directions, so that the rising gas is cumulatively cooled and condensed by the descending water, the ascending contents of the pipe being last acted on by the coldest portion of the water, whereby the utmost thermal efficiency of the water is utilized and a sufficient velocity of upward movement of gas maintained within the pipe to sweep along the liquid of condensation to and through the discharge end of the pipe, as set forth.

3. In a gas condenser, the combination of a series of substantially vertical pipes, each of relatively small internal diameter, means for the admission of gas simultaneously into the lower portions of all of said pipes, their upper portions having outlets for the liquid of condensation, and means for maintaining descending currents or films of water on the external surfaces of said pipes, as set forth.

4. In a gas condenser, the combination of a gas receptacle, a series of substantially vertical pipes, each of relatively small internal diameter and each extending upwardly from points in close proximity to the bottom of said receptacle, the main portion of the receptacle being above the lower ends of said pipes and communicating therewith through narrow openings between the lower ends of the pipes and the bottom of the receptacle, whereby gas rising in said pipes is caused to lift accumulations of liquid from the bottom of the receptacle, a liquid receptacle communicating with the upper ends of said pipes but located below said ends, so that liquid may accumulate in said receptacle below the discharge ends of the pipes, said receptacle having a suitable outlet, and means for maintaining a descending current of water on the external surfaces of said pipes, as set forth.

5. The gas receptacle having a screw-threaded orifice in its upper side, combined with a pipe threaded at its lower end to engage said orifice and provided with a loose longitudinally movable nipple projecting below the lower end of the pipe and adapted to rest in contact with and adjust itself to the bottom of the receptacle, as set forth.

In testimony whereof I have signed my name to this specification, in the presence of two subscribing witnesses, this 10th day of October, A. D. 1895.

WM. LEE CHURCH.

Witnesses:
A. THOMAS NICKERSON, Jr.,
HENRY J. COVAL.